US008626156B2

(12) United States Patent
Marsico

(10) Patent No.: US 8,626,156 B2
(45) Date of Patent: Jan. 7, 2014

(54) METHODS, SYSTEMS, AND COMPUTER READABLE MEDIA FOR SELECTIVE POLICY ENHANCEMENT (PE) FOR HIGH-USAGE ROAMERS

(75) Inventor: Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 81 days.

(21) Appl. No.: 13/276,916

(22) Filed: Oct. 19, 2011

(65) Prior Publication Data
US 2012/0100849 A1    Apr. 26, 2012

Related U.S. Application Data

(60) Provisional application No. 61/405,137, filed on Oct. 20, 2010.

(51) Int. Cl.
*H04W 4/00*    (2009.01)

(52) U.S. Cl.
USPC ........ 455/432.1; 455/433; 455/405; 455/406; 455/439; 455/456.1

(58) Field of Classification Search
USPC ............ 455/432.1, 433, 405, 406, 439, 456.1
See application file for complete search history.

(56) References Cited

U.S. PATENT DOCUMENTS

| 7,072,651 B2 | 7/2006 | Jiang et al. |
|---|---|---|
| 2003/0003928 A1 | 1/2003 | Marjelund et al. |
| 2005/0107091 A1 | 5/2005 | Vannithamby et al. |
| 2007/0195788 A1 | 8/2007 | Vasamsetti et al. |
| 2008/0043689 A1 | 2/2008 | Walter |
| 2009/0109845 A1 | 4/2009 | Andreasen et al. |
| 2009/0225762 A1 | 9/2009 | Davidson et al. |
| 2009/0228956 A1* | 9/2009 | He et al. ............................ 726/1 |
| 2009/0325574 A1 | 12/2009 | Izawa et al. |
| 2010/0048161 A1 | 2/2010 | He et al. |
| 2010/0080171 A1 | 4/2010 | Rune et al. |
| 2010/0241496 A1 | 9/2010 | Gupta et al. |
| 2010/0246500 A1 | 9/2010 | Rydnell et al. |

(Continued)

FOREIGN PATENT DOCUMENTS

| EP | 1 988 680 A1 | 11/2008 |
|---|---|---|
| EP | 2 093 931 A1 | 8/2009 |
| WO | WO 2009/058067 A1 | 5/2009 |
| WO | WO 2011/082035 A2 | 7/2011 |

OTHER PUBLICATIONS

Communication of European Publication Number and Information on the Application of Article 67(3) EPC for European Patent Application No. 10841576.1 (Oct. 10, 2012).

(Continued)

*Primary Examiner* — Barry Taylor
(74) *Attorney, Agent, or Firm* — Jenkins, Wilson, Taylor & Hunt, P.A.

(57) ABSTRACT

According to one aspect, the subject matter described herein includes a method for modifying policy information associated with a roaming subscriber. The method includes receiving a first signaling message. The first signaling message includes a policy or quality of service (QoS) attribute associated with a roaming subscriber and originating from a home network of the roaming subscriber. The method also includes determining, using information associated with the roaming subscriber or a provider network, that the policy or QoS attribute should be modified and modifying the policy or QoS attribute for application in the provider network.

23 Claims, 8 Drawing Sheets

(56) References Cited

U.S. PATENT DOCUMENTS

| | | | |
|---|---|---|---|
| 2010/0291924 A1 | 11/2010 | Antrim et al. | |
| 2010/0297985 A1 | 11/2010 | Van Erlach | |
| 2011/0103261 A1 | 5/2011 | Duan | |
| 2011/0116382 A1 | 5/2011 | McCann et al. | |
| 2011/0158090 A1 | 6/2011 | Riley et al. | |
| 2011/0188457 A1* | 8/2011 | Shu et al. | 370/329 |
| 2011/0217979 A1 | 9/2011 | Nas | |
| 2012/0028626 A1* | 2/2012 | Marocchi et al. | 455/422.1 |
| 2012/0039175 A1 | 2/2012 | Sridhar et al. | |
| 2012/0094685 A1 | 4/2012 | Marsico | |
| 2012/0099529 A1 | 4/2012 | Williams | |
| 2012/0099715 A1* | 4/2012 | Ravishankar et al. | 379/114.01 |
| 2012/0257499 A1 | 10/2012 | Chatterjee et al. | |

OTHER PUBLICATIONS

Commonly-assigned, co-pending U.S. Appl. No. 61/671,691 for "Methods and System for Dynamically Controlling Signaling Costs in a Mobile Network," (Unpublished, filed Jul. 14, 2012).

Notificatino of Transmittal of the International Serach Report and the Written Opinion of the International Seraching Authority, or the Declaration for International Patent Application No. PCT/US2010/061586 (Sep. 26, 2011).

3GPP, "3rd Generation Partnership Project; Technical Specification Group Services and System Aspects; Universal Geographical Area Description (GAD) (Release 10)," 3GPPS TS 23.032 V10.0.0, pp. 1-29 (Mar. 2011).

"Smart Cards; Card Application Toolkit (CAT) (Release 9)," ETSI TS 102 223 V9.2.0, pp. 1-209 (Oct. 2010).

3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).

3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).

3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).

3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010).

3GPP, "3rd Generation Partnership Project; Technical Specification Group Core Network and Terminal; Non-Access-Stratum (NAS) Functions Related to Mobile Station (MS) in Idle Mode (Release 10)," 3GPP TS 23.122 v10.0.0, pp. 1-41 (Jun. 2010).

3GPP, "Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3 (3GPP TS 29.274 version 9.3.0 Release 9)," ETSI TS 129 274 V9.3.0, pp. 1-162 (Jun. 2010).

3GPP, "3rd Generation Partnership Project; Technical Specification Group Services and System Aspects; Telecommunication management; Charging management; Diameter charging applications (Release 9)," 3GPP TS 32.299 V9.4.0, pp. 1-149 (Jun. 2010).

Znaty, "Diameter, GPRS, (LTE+ePC=EPS), IMS, PCC and SDM," Effort, pp. 1-229 (Part 1 of 2) (May 2010).

Znaty, "Diameter, GPRS, (LTE+ePC=EPS), IMS, PCC and SDM," EFORT pp. 230-461 (Part 2 of 2) (May 2010).

"Universal Mobile Telecommunications System (UMTS); LTE; Policy and Charging Control over Gx Reference Point (3GPP TS 29.212 version 9.2.0 Release 9)," ETSI TS 129 212 V9.2.0, pp. 1-115 (Apr. 2010).

3GPP. "3rd Generation Partnership Project; Technical Specification Group Core Network and Terminals; Policy and Charging Control over Gx Reference Point (Release 9)," 3GPP TS 29.212 V9.2.0, pp. 1-111 (Mar. 2010).

3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).

3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 verison 8.3.0 Release 8)," ETSI TS 131 111 V8.3.0, pp. 1-102 (Oct. 2008).

International Standard, "Maritime Navigation and Radiocommunication Equipment and Systems—Digital Interfaces—Part 1: Single Talker and Multiple Listeners," IEC 61662-1, Second edition, pp. 1-86 (Jul. 2000).

Non-Final Office Action for U.S. Appl. No. 13/040,020 (Jul. 18, 2013).

Final Office Action for U.S. Appl. No. 13/251,784 (Jun. 26, 2013).

Final Office Action for U.S. Appl. No. 12/973,228 (Jun. 21, 2013).

Non-Final Office Action for U.S. Appl. No. 12/973,228 (Feb. 1, 2013).

Non-Final Office Action for U.S. Appl. No. 13/251,784 (Dec. 19, 2012).

\* cited by examiner

| ROAMING / VISITING SUBSCRIBER ID | AVG. OBSERVED ROAMING FREQUENCY (E.G., DAYS/MONTH, HOURS/DAY) | SERVICE / APN USAGE METRICS (E.G., VOICE, STREAMING, GAMING, WEB BROWSING, MESSAGING, ETC.) | POLICY ENHANCEMENT OFFER LOG (E.G., GUARANTEED DL BITRATE) |
|---|---|---|---|
| 9193451414 | 13 DAYS/MONTH | WEB BROWSING 50%, STREAMING 30%, VOICE 20% | +25% DOWNLOAD BITRATE BOOST PROVIDED ON 10/1/2010 FOR 34 MINUTES |

EXEMPLARY ROAMING SUBSCRIBER USAGE PROFILE + LOG DATA — 700

| SUBSCRIBER ID | INCENTIVE TRIGGER 1 (E.G., OFFER DATE/TIME WINDOW) | INCENTIVE TRIGGER 2 (E.G., LOCATION) | INCENTIVE POLICY ENHANCEMENT OFFER (E.G., GUARANTEED DL BITRATE) | MAXIMUM DURATION OF ENHANCEMENT |
|---|---|---|---|---|
| ANY ROAMER | 2/1/2011 1AM – 2/1/2011 5AM | STARBUCKS STORE #12 (E.G., GEOLOCATION COORDS + PROXIMITY RADIUS, TRACKING AREA CODE, CELL ID, LOCATION AREA CODE, ETC.) | +25% | 1HR |
| ANY ROAMER | 2AM – 6AM | * | +15% | 30 MIN |

EXEMPLARY ROAMING SUBSCRIBER POLICY ENHANCEMENT DATA — 702

FIG. 7

METHODS, SYSTEMS, AND COMPUTER READABLE MEDIA FOR SELECTIVE POLICY ENHANCEMENT (PE) FOR HIGH-USAGE ROAMERS

PRIORITY CLAIM

This application claims the benefit of U.S. Provisional Patent Application Ser. No. 61/405,137, filed Oct. 20, 2010, the disclosure of which is incorporated herein by reference in its entirety.

TECHNICAL FIELD

The subject matter described herein relates to policy provisioning. More specifically, the subject matter relates to methods, systems, and computer readable media for selective PE for high-usage roamers.

BACKGROUND

Traditionally, control of quality of service (QoS) within telecommunications networks has been achieved using a combination of best-effort data delivery, network resources reservation, or data packet marking on data communication paths. However, the design of emerging next generation network (NGN) architectures (e.g., Internet protocol (IP) multimedia subsystem (IMS) and long term evolution (LTE)) will render this approach no longer viable. One feature of network topology within the various NGNs is that the signaling required to negotiate a data transfer (e.g., application signaling) may not travel on the same logical path as the actual data transfer itself (e.g., data traffic). Therefore, a policy entity is needed to link the application signaling on the service plane to data traffic on the transport plane in order to allow applications to request QoS to be performed on the traffic plane.

One example of such a policy entity is a policy and charging rules function (PCRF). The PCRF, or policy server, generally is a policy decision point that may be centrally located in the network and may communicate with access edge devices (e.g., policy enforcement points), applications, and operational support systems/business support systems (OSS/BSS) platforms to manage subscriber and network information according to policy rules. These policy rules may be used to define how broadband network resources should be allocated to subscribers and applications and under what conditions. Policy rules may encompass the business and technological rules that govern which network services a subscriber can access, at what bandwidth level, when, and for how long. The PCRF may identify appropriate policy rules by querying a subscription profile repository (SPR) for relevant policy information.

Some policy and charging control (PCC) architectures retrieve policy rules associated with a roaming subscriber from the PCRF in the roaming subscriber's home network. The policy rules may be applied in the visited network such that the roaming subscriber receives a similar experience or quality of service (QoS) as when using the roaming subscriber's home network. One drawback or issue with these architectures is that a visited network typically may not dictate policy or QoS attributes for a roaming subscriber. Another drawback is that the visited network may not fully utilize marketing opportunities to potential subscribers.

Accordingly, a need exists for methods, systems, and computer readable media for selective policy enhancement (PE) for high-usage roamers.

SUMMARY

According to one aspect, the subject matter described herein includes a method for modifying policy information associated with a roaming subscriber. The method includes receiving a first signaling message. The first signaling message includes a policy or quality of service (QoS) attribute associated with a roaming subscriber and originating from a home network of the roaming subscriber. The method also includes determining, using information associated with the roaming subscriber or a provider network, that the policy or QoS attribute should be modified and modifying the policy or QoS attribute for application in the provider network.

A system for modifying policy information associated with a roaming subscriber is also disclosed. The system includes at least one communications interface configured to receive a first signaling message. The first signaling message the first signaling message includes a policy or QoS attribute associated with a roaming subscriber and originating from a home network of the roaming subscriber. The system also includes a policy enhancement (PE) module configured to determine, using information associated with the roaming subscriber or a provider network, that the policy or QoS attribute should be modified and configured to modify the policy or QoS attribute for application in the provider network.

The subject matter described herein for modifying policy information associated with a roaming subscriber may be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

The subject matter described herein will now be explained with reference to the accompanying drawings of which:

FIG. 7 is a diagram illustrating exemplary data for selective PE according to an embodiment of the subject matter described herein.

DETAILED DESCRIPTION

The subject matter described herein includes methods, systems, and computer readable media for selective policy enhancement (PE). According to one aspect, the present subject matter described herein allows a network operator or service provider to identify a subscriber that has roamed into its network and to temporarily "boost" or enhance one or more policy or QoS attributes that are provided to the roaming subscriber via the network operator's policy and charging enforcement function (PCEF). For example, a network element (e.g., a Diameter signaling agent (DRA), a Diameter signaling router (DSR), a policy and charging rule function (PCRF), or a resource admissions control subsystem (RACS)) may monitor and log, over time, usage information about roaming subscribers. Using this collected information, the operator may strategically target and entice certain roaming subscribers (e.g., high-usage roamers) to switch service providers by temporarily providing the roaming subscriber with "boosted" or enhanced policy or QoS attributes within the operator's network.

Additionally, the network element, the network operator, or an associated entity may notify the roaming subscriber of the temporarily enhanced service, such as for marketing purposes. For example, after enhancing a roaming subscriber's service, a message indicating the change and including an offer for switching to the providing operator's service may be sent to the subscriber. Notification messages may be provided in various forms, such as a short message service (SMS) message, a multimedia message service (MMS) message, an instant message (IM) message, an email message, an extensible markup language (XML) message, a simple object access protocol (SOAP) message, a Diameter protocol message, a session initiation protocol (SIP) message, an Internet protocol (IP) message, or a voice message.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
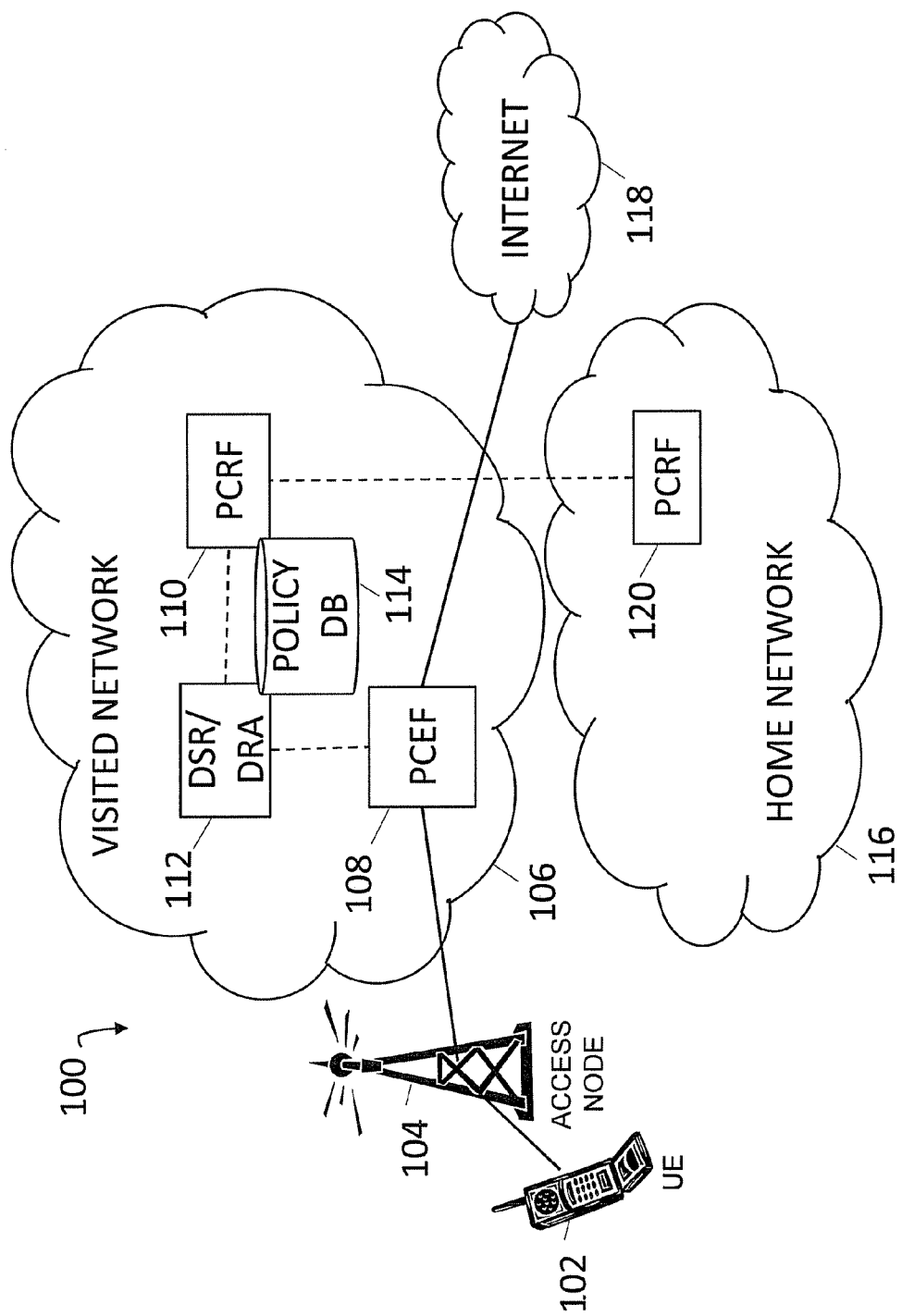
FIG. 1 is a network diagram showing an exemplary network for selective policy enhancement (PE) according to an embodiment of the subject matter described herein.

FIG. 1 is a network diagram showing an exemplary network for selective PE according to an embodiment of the subject matter described herein. FIG. 1 is a block diagram illustrating an exemplary communications network 100 according to an embodiment of the subject matter described herein. Referring to FIG. 1, network 100 may include user equipment (UE) 102, an access node (AN) 104 (e.g., a base transceiver station (BTS) or evolved node b (e node b)), a visited network 106, a home network 116, and Internet 118.

UE 102 represents a device, such as a mobile handset, for communicating with one or more portions of network 100. For example, UEs may include a computer, a pager, a smartphone, a phone, a wireless modem, a hotspot, a computing platform, a mobile handset, and other subscriber devices.

UE 102 may be associated with a home network 116. For example, a user of UE 102 may be a subscriber of home network 116 or a related service provider. Home network 116 may be a network for providing various services for UE 102. For example, home network 116 may perform network aggregation, charging, and authentication functions for UE 102. In one embodiment, home network 116 may be at least one of a 3G network, a 3G+ network, a GSM network, a 4G network, an LTE network, an EPC network, a 3rd Generation Partnership Project (3GPP) network, a GPRS core network, or other network. Home network 116 may include a PCRF 120. PCRF 120 may determine and/or provide policy and charging control (PCC) rules for UE 102. For example, in a roaming scenario, PCRF 120 may communicate policy information for one of its subscribers to foreign nodes in other networks (e.g., a visited network 106).

While roaming, UE 102 may communicate with access node 104 associated with visited network 106. Access node 104 may be located within an access network (not shown). An access network may include nodes, functions, devices, and/or components for providing a UE 102 access to services, functions, or devices in one or more networks (e.g., visited network 106). For example, an access network may include a radio access network (RAN) or other access network, such as a Global System for Mobile Communications (GSM) RAN (GRAN), a GSM enhanced data rates for GSM evolution (EDGE) RAN (GERAN), a general packet radio service (GPRS) access network, a universal mobile telecommunications system (UMTS) RAN (UTRAN), an evolved UTRAN (eUTRAN), an Internet protocol (IP) connectivity access network (IP CAN), a code division multiple access (CDMA) network, an Evolution-Data Optimized (EV-DO), a wideband CDMA (WCDMA) network, a High Speed Packet Access (HSPA) network, or an evolved HSPA (eHSPA+) network.

Access node 104 may perform radio access functions for connecting UE 102 with various communications networks and/or nodes. Access node 104 may communicate with visited network 106 using gateway functionality. For example, access node 104 or other node (e.g., a gateway) may communicate messages (e.g., authentication or mobility related messages) to one or more nodes within the visited network 106.

Visited network 106 may be a network for providing services UE 102. For example, visited network 106 may perform network aggregation, charging, and authentication functions for UE 102 in association with home network 116. In one embodiment, visited network 106 may be at least one of a 3G network, a 3G+ network, a GSM network, a 4G network, an LTE network, an EPC network, a 3rd Generation Partnership Project (3GPP) network, a GPRS core network, or other network.

Visited network 106 may include a PCEF 108 and a PCRF 110. Visited network 106 may also include other nodes, such as a DRA/DSR 112, a policy database 114, a mobility management entity (MME), a home subscriber server (HSS), an authentication, authorization, and accounting (AAA) server, and a bearer binding and event reporting function (BBERF).

PCEF 108 may be any suitable entity for generating and/or enforcing policies (e.g., one or more policy rules). For example, PCEF 108 may include functionality located at a gateway (e.g., a packet data network (PDN) gateway) or other node for communicating between networks, e.g., Internet 118. In one embodiment, PCEF 108 manages and enforces policy and charging control (PCC) rules provided by PCRF 110. For example, rules may be provided for each session data flow (SDF) and/or UE 102 attempting to use PCEF 108. In this example, PCEF 108 may control access to external networks and charge for such access based on rules received from PCRF 110.

In some embodiments, PCEF 108 may include or be integrated with a gateway GPRS support node (GGSN) for communicating between a GPRS network and external networks, e.g., Internet 118. For example, in an embodiment where visited network 106 includes a GPRS core network, PCEF 108 may include a GGSN. PCEF 108 may communicate with serving GPRS support node (SGSN) or other gateway for providing services to UE 102. For example, PCEF 108 may request and receive PCC rules from PCRF 110. Using the PCC rules, PCEF 108 may control access to external networks and charge for such access based on the PCC rules. For example, for an SDF (e.g., one or more related packets) that is under policy control, PCEF 108 may allow the SDF to pass through the node if the corresponding gate is open (e.g., as determined by one or more relevant PCC rules). For an SDF that is under charging control, PCEF 108 may allow the SDF to pass through the node if there is a corresponding active PCC rule and, for online charging, the OCS has authorized the applicable credit with that charging key. PCEF 108 may let an SDF pass through the gateway during the course of the credit re-authorization procedure. If requested by PCRF 110, PCEF 108 may report to PCRF 110 when the status of the related SDF changes, which can be used to monitor an IP-CAN bearer path dedicated for AF signaling traffic.

PCEF 108 may also include a BBERF. The BBERF may be any suitable entity for performing bearer binding and/or event reporting. In one embodiment, the BBERF may control user plane traffic. For example, the BBERF may ensure that an SDF is carried over a bearer path with an appropriate quality of service and may perform resource reservation. The BBERF may also provide event reporting to one or more nodes in network 100. For example, the BBERF may inform PCRF 110 of various network or bearer-related events, e.g., based on event triggers installed or requested by PCRF 110.

DRA/DSR 112 may be any suitable entity for routing or relaying Diameter signaling messages routing between Diameter nodes. For example, DRA/DSR 112 may be an LTE signaling router, an LTE Diameter signaling router, a Diameter signaling agent, a Diameter proxy, a Diameter routing agent, or a Diameter redirect agent.

DRA/DSR 112 may communicate with PCEF 108, PCRF 110, policy database 114, and/or other nodes via one or more signaling interfaces. For example, DRA/DSR 112 may exchange or communicate messages between PCEF 108 and PCRF 110 via one or more LTE Gx interfaces. In a second example, DRA/DSR 112 may exchange or communicate messages via an HTTP interface, an XML interface, or another interface.

PCRF 110 may be any suitable entity for creating, selecting, or otherwise determining policies (e.g., one or more PCC rules). For example, PCRF 110 may be a stand-alone node, e.g., a policy server or a multimedia policy engine (MPE), or may be co-located or integrated with one or more nodes in network 100, e.g., a DRA/DSR. PCRF 110 may inform PCEF 108, through the use of PCC rules, on the treatment of each SDF that is under PCC control, in accordance with policy decisions. In performing policy decisions, PCRF 110 may communicate with one or more nodes in network 100 for gathering subscription related information. For example, PCRF 110 may communicate with SPRs to retrieve policy information. In another example, PCRF 110 may communicate with a network management system (NMS), e.g., via a simple network management protocol (SNMP) interface. In this example, PCRF 110 may poll or otherwise query the NMS or a related database to receive information, e.g., regarding the state of one or more devices in an access network, core network, or other network.

PCRF 110 may communicate with PCRF 120 for determining PCC rules for communications associated with a roaming subscriber. For example, PCRF 110 may request policy information from PCRF 120 via one or more interfaces, such as an S9 interface, an extensible markup language (XML) interface, etc. In another example, PCRF 120 may send policy information (e.g., via a re-authorization request (RAR) message) to PCRF 110 dynamically or in response to triggers.

Subscription related information may be used (e.g., by PCRF 110 or PCRF 120) in generating PCC rules. PCC rules typically include information for managing user plane traffic (e.g., data packets). For example, a PCC rule may include a rule name, service identifier, SDF filter(s), precedence information, gate status, QoS parameters, charging key (i.e., rating group), other charging parameters, and/or monitoring key. The rule name or PCC rule identifier may be used to reference a PCC rule in the communication between the PCEF and the PCRF and may be unique for each PCC rule used during an IP-CAN session. The service identifier may be used to identify the service or the service component to which the SDF relates. The SDF filter(s) may be used to select the traffic for which the rule applies.

For example, an SDF filter make take the form of an IP five-tuple specifying: (1) source IP address(es), (2) destination IP address(es), (3) source port number(s), (4) destination port number(s), and (5) application protocol(s) (e.g., transmission control protocol (TCP), user datagram protocol (UDP)). In this example, packets containing information matching the IP five-tuple may be considered part of the SDF for which the corresponding PCC rule is to be applied. In another example, an SDF filter may be based on fewer, different, and/or additional criteria. For instance, UE 102 or another node in network 100 may assign an SDF identifier (e.g., a value) to packets in a custom parameter field. In this instance, an SDF filter in a PCC rule may use this parameter for determining traffic for which the rule applies.

PCC policy decisions may be based on one or more of the following: information obtained from an AF via the Rx interface (e.g., session, media, and subscriber related information), information obtained from PCEF 108 (e.g., Internet Protocol Connectivity Access Network (IP-CAN) bearer attributes, request type, device information, and subscriber related information), information obtained from SPR (e.g., subscriber and service related data), information obtained from nodes in other networks (e.g., PCRF 120 via an S9 interface), and pre-configured information. If the information from PCEF 108 contains traffic mapping information not matching any SDF filter known to PCRF 110, and PCRF 110 allows the UE to request enhanced QoS for services not known to PCRF 110, PCRF 110 may add the traffic mapping information as SDF filters to the corresponding authorized PCC rule. PCRF 110 may wildcard missing filter parameters, e.g., missing uplink TFT address and port information in case of GPRS. For example, a blank or "wildcard" filter (e.g., port number="*") may consider any value (including an empty or zero value) as matching the filter criteria.

Policy database 114 may represent a suitable entity for storing or maintaining subscription related information, such as subscription profiles, policy information, and/or PCC rules. For example, policy database 114 may include an SPR, an HSS, an AAA, or other node. Policy database 114 may store policy information for use by PCRF 110 in making policy decisions. In one embodiment, a subscription profile may include authorization information, charging information, subscription information (e.g., access or service tiers), and quality of service (QoS) information associated with a subscriber, session, device, and/or an SDF. For example, a subscription profile may include information on a subscriber's permitted services, service pre-emption priorities, allowed QoS, and charging related data information for different types of SDFs.

Policy database 114 may maintain information about roaming subscribers. For example, policy database 114 may store information associated with subscriber usage information, e.g., hours of use per month, amount of data consumed, types of data consumed, and roaming frequency. Policy database 114 may also store information associated with PE, such as triggers or enhancement criteria, enhancement offers (e.g., policy attributes and percentage increased or decreased during enhancement), history of enhancements, and duration of enhancements. The stored information may be used to determine whether a roaming subscriber should be provided PE. Additional information regarding exemplary data that may be stored at or in policy database 114 is discussed below with regard to FIG. 7.

Policy database 114 may communicate with or be accessed by PCRF 110 and various other nodes, e.g., a HSS, an AAA, an MME, an application function (AF) and or DRA/DSR 112. Policy database 114 may be located external to or distinct from PCRF 110 or may be co-located or integrated with PCRF 110. In some embodiments, network 100 may include multiple policy databases. For example, some policy databases may be located in various locations (e.g., networks) distinct from PCRF 110 and another policy database may be co-located or integrated with PCRF 110 or another node in network 100.

It will be appreciated that FIG. 1 is for illustrative purposes and that various nodes, their locations, and/or their functions may be changed, altered, added, or removed. For example, some nodes and/or functions may be combined into a single entity, e.g., policy database 114 and PCRF 110 may be included in an MPE. In a second example, a node and/or function may be located at or implemented by two or more nodes.

Figure 2:
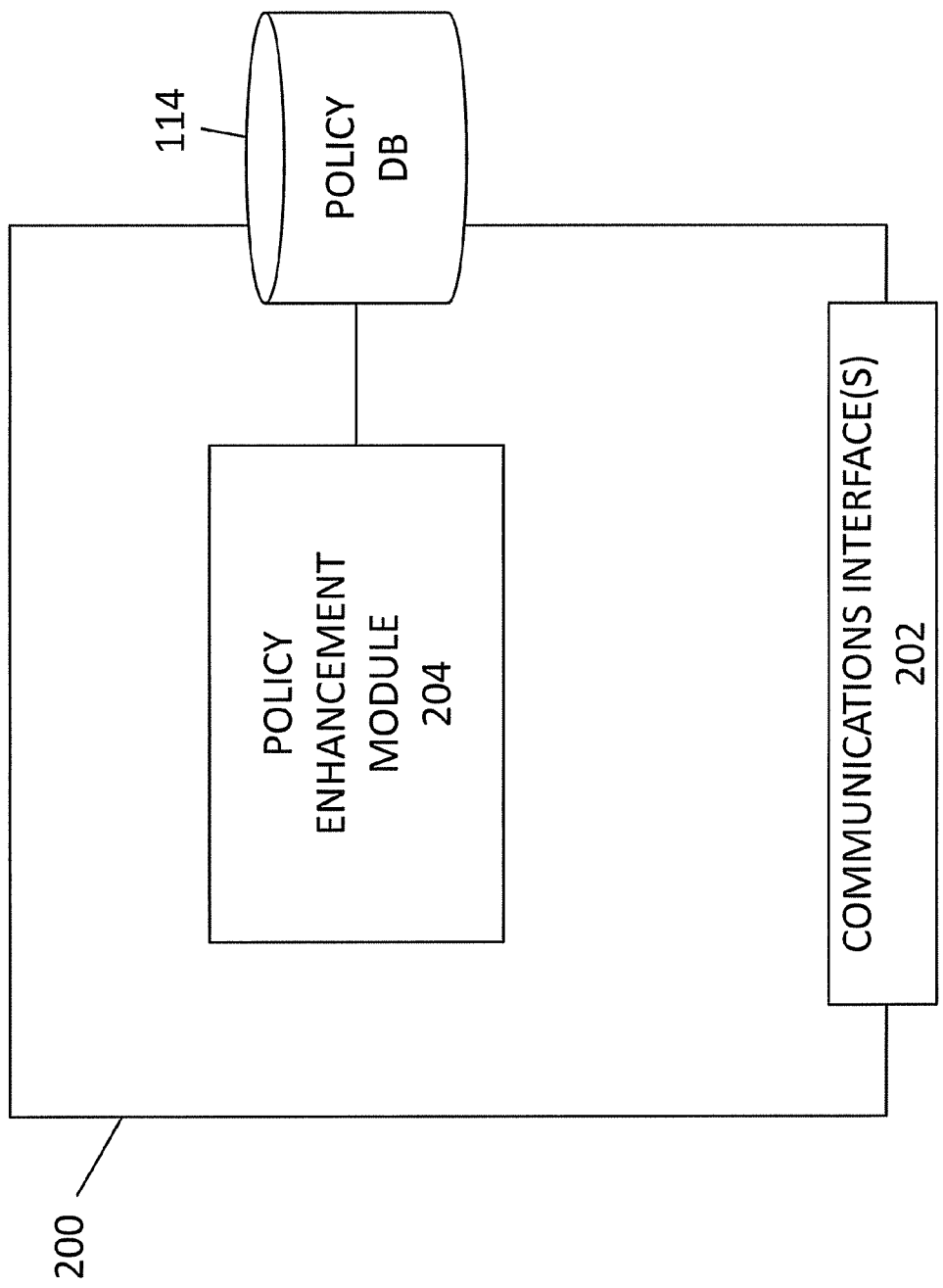
FIG. 2 is block diagram illustrating an exemplary node for selective PE according to an embodiment of the subject matter described herein.

FIG. 2 is block diagram illustrating an exemplary PE node 200 for selective PE according to an embodiment of the subject matter described herein. PE node 200 may be a standalone node or may be integrated with additional functionality or another node. For example, PE node 200 may be integrated with or include PCRF 110, DRA/DSR 112, or an AF.

Referring to FIG. 2, PE node 200 may include one or more communications interfaces 202 for communicating messages (e.g., via a Gx interface, Gxx interface, Sp interface, an extensible markup language (XML) interface, a SIP interface, a SOAP interface, or a hypertext transfer protocol (HTTP) interface or others). For example, where PE node 200 includes PCRF 110, a credit control request (CCR) message may be received via a Gx interface from PCEF 108. PE node 200 may modify the CCR message and provide it towards PCRF 120 via a Gx, Sp, or other interface. In another example, PE node 200 may receive a policy request message via an HTTP or SIP interface from an IMS node. In yet another example, PE node 200 may include one or more interfaces (e.g., Sp, SOAP, or HTTP) for communicating with policy database 114.

PE node 200 may include a PE module 204 for modifying policy information. For example, PE module 204 may inspect a received Gx message, or portion thereof, (e.g., a CCR message from PCEF 108) for subscriber identifying information. PE module 204 may use subscriber identifying information (e.g., an SDF identifier and/or an international mobile subscriber identifier (MI)) and/or other information for determining whether the subscriber is a roaming subscriber. For example, PE module 204 may request and receive usage statistics and other information associated with the subscriber identifying information from policy database 114. Using the received information, PE module 204 may determine that the subscriber is a roaming subscriber.

In an alternate embodiment, PE module 204 may receive and/or process only messages associated with roaming subscribers. For example, PCRF 110, DRA/DSR 112, or PCEF 108 may query an HSS or AAA for determining whether a message is associated with a roaming subscriber. If the message is determined to be associated with a roaming subscriber, the message may be sent to PE module 204 for processing.

As stated above, PE module 204 may receive information associated with a roaming subscriber from policy database 114. PE module 204 may also receive PE data from policy database 114. PE data may include various information about relevant PE offers, such as enhancement criteria, attributes to be enhanced, amount of enhancement, and duration of enhancement. Using this information and/or other data (e.g., network conditions, user device location, and/or temporal information), PE module 204 may determine that PE should be performed. For example, after analyzing usage statistics retrieved from policy database 114, PE module 204 may identify the subscriber as a high-usage, frequent roamer, e.g., a smartphone or tablet user that consumes a large amount of data per month in visited network 106. Such usage statistics may indicate, based on one or more enhancement triggers associated with an enhancement offer, that PE should be performed.

It will be appreciated that PE may be offered for various reasons, including marketing, experimental, educational, and/or other reasons. As such, enhancement offers may be triggered based on various factors, such as type of user device, day of week, time of day, user device location (e.g., a marketing partner's fast food restaurant or a school), roaming frequency, a network condition, an access network, SDF identifier, and/or other criteria.

After determining that PE should be performed, PE module 204 may initiate modifying policy information. For example, PE module 204 may receive a policy request message and set a trigger such that a corresponding answer message (e.g., from PCRF 110 or PCRF 120) having policy information is detected and modified. For example, PE module may increase one or more policy or QoS attributes, such as a QoS class and a guaranteed download bitrate, associated with the roaming subscriber. PE module 204 or another entity (e.g., communications interface 202) may provide or initiate providing the modified policy information (e.g., as PCC rules) to PCEF 108.

In some embodiments, modification of policy information may be for enticing potential subscribers to switch service providers by enhancing service and/or experience of the roaming subscriber via visited network 106. For example, DRA/DSR 112 may increase a guaranteed minimum download bitrate or QoS class associated with a roaming subscriber before sending the modified policy information to PCEF 108. PCEF 108 may receive, apply, and/or enforce the modified policy information (e.g., PCC rules). In response, the roaming subscriber may experience a better service via visited network 108 vs. home network 116. Hence, the roaming subscriber may be persuaded or enticed to switch providers based on the temporary PE.

PE module 204 or another entity (e.g., communications interface 202) may notify a roaming subscriber about PE. For example, concurrently, prior to, or after providing a modified policy to PCEF 108, a message may be sent to the roaming subscriber indicating that enhanced data service is being provided courtesy of a providing network and/or a related marketing partner. The message may also include links, contact information, and other data for marketing purposes. Exemplary notification messages may include an SMS message, an MMS message, an IM message, an email message, an XML message, a SOAP message, a Diameter protocol message, a SIP message, an IP message, or a voice message.

In some embodiments, a roaming subscriber may be required to approve and/or accept PE and/or marketing offers before an enhanced or modified policy is enforced. For example, an SMS message may indicate that a roaming subscriber is eligible for enhanced data service courtesy of a providing network (e.g., Verizon Wireless or AT&T) and may receive this enhanced service if the user accepts by responding to the eligibility message with a valid email address so as to receive current promotional information.

Figure 3:
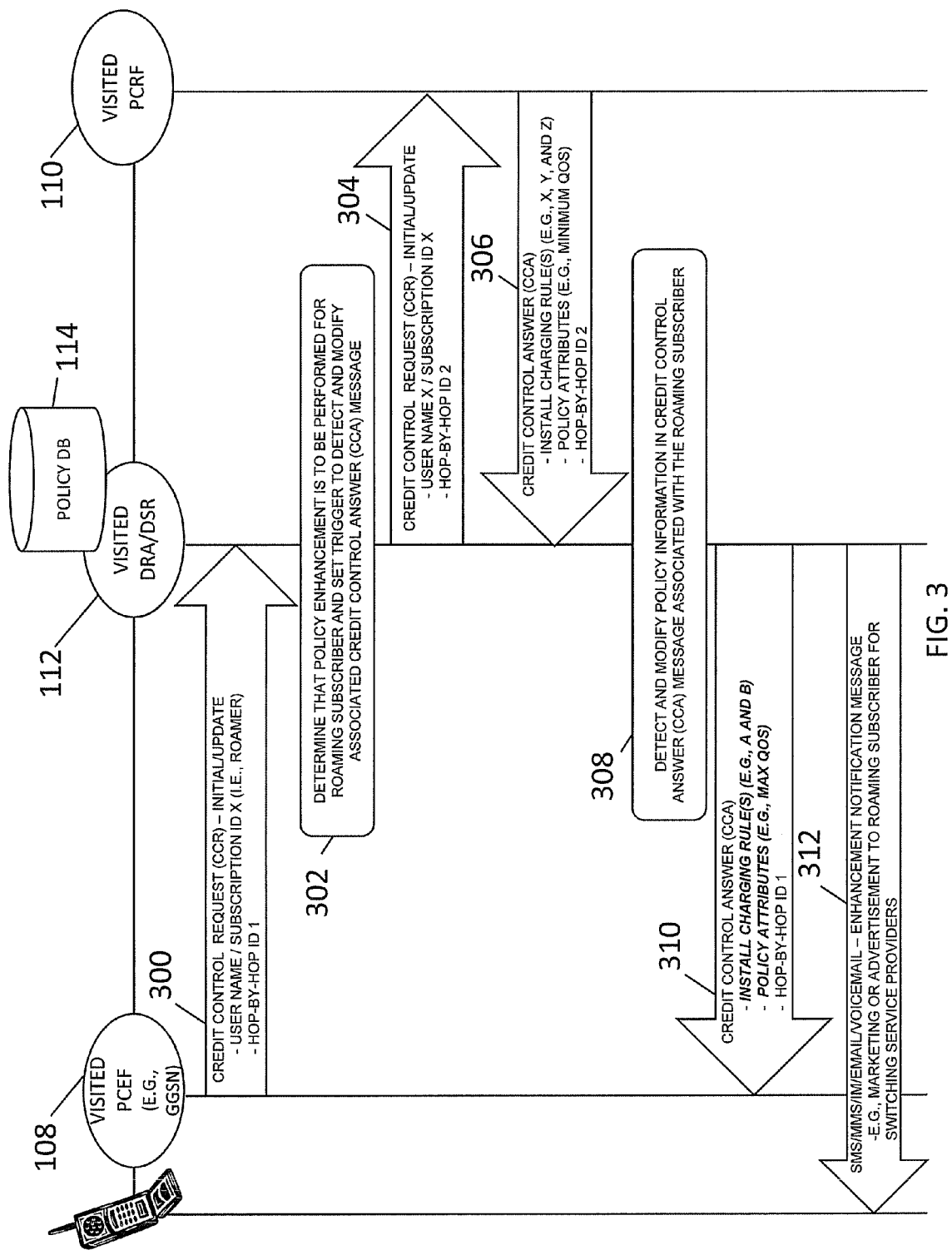
FIG. 3 is a message flow diagram illustrating modifying policy information in a credit control answer (CCA) message according to an embodiment of the subject matter described herein.

FIG. 3 is a message flow diagram illustrating modifying policy information in a CCA message according to an embodiment of the subject matter described herein. In this embodiment, DRA/DSR 112 may be PE node 200 having PE module 204. DRA/DSR 112 may also access policy database 114.

PCEF 108 may establish a session for roaming subscriber ID 'X' through an IP Connectivity Access Network (e.g., a WLAN). IP-CAN is a collection of network entities and interfaces that provides IP transport connectivity between UEs and core network entities. In one exemplary IP-CAN session establishment scenario, PCEF 108 may receive an IP-CAN session creation request. The IP-CAN session creation request may be a GTP message or a trigger message. PCEF 108 may initiate a PULL procedure (e.g., policy provisioning that is solicited by PCEF 108) for applying relevant PCC rules associated with the roaming subscriber.

In step 300, PCEF 108 (e.g., PDN gateway or GGSN) may send a policy request message towards PCRF 110 (e.g., a policy server). For example, the policy request message may be a CCR message communicated via a Ox interface for requesting policies to be applied to the IP-CAN session. The policy request message may be for requesting PCC rules associated with a roaming subscriber and may include a subscriber identifier (ID), a hop-by-hop ID (for identifying the last hop or node), and SDF information, e.g., an SDF identifier. In an alternate embodiment, a policy request message may be sent to PCRF 110 via another interface, such as a SIP, a SOAP, or an HTTP interface.

In step 302, DRA/DSR 112 may intercept and/or receive the policy request message. DRA/DSR 112 may determine, using information in the message and/or other information, that the policy request message is associated with a foreign or roaming subscriber. For example, DRA/DSR 112 may query an HSS or AAA using a subscriber ID from the message or other subscriber identifying information. The HSS or AAA may respond by indicating that the subscriber ID is associated with a roaming subscriber. DRA/DSR 112 may also query policy database 114 for information about the roaming subscriber. Using this information, DRA/DSR 112 may determine that PE is to be performed. DRA/DSR 112 may set a trigger (e.g., using Hop-by-Hop ID value 2) or use another mechanism for detecting and modifying policy information in an associated answer message (e.g., a CCR message).

In step 304, DRA/DSR 112 may send the policy request message or similar message to PCRF 110. The policy request message may include a different hop-by-hop ID (e.g., a hop-by-hop ID associated with DRA/DSR 112). PCRF 110 may receive the message and, using information from that message and/or other information, may request and receive policy information from PCRF 120 and/or another node in home network 116. For example, PCRF 110 may communicate with PCRF 120 via an S9 interface. After receiving policy information from home network 116, PCRF 110 may generate an associated response or answer message (e.g., a CCR message). The answer message may include policy information (e.g., PCC rules) based, at least in part, on information received from PCRF 120. For example, a CCR message may include charging rules (e.g., rules for billing a subscriber) and policy or QoS attributes, such as a QoS class identifier, a guaranteed download bitrate amount, and/or other service affecting information.

In step 306, PCRF 110 may send the answer message towards PCEF 108. DRA/DSR 112 may intercept and/or receive the answer message. DRA/DSR 112 may use triggers or other mechanisms for detecting answer messages that are associated with a PE service. For example, DRA/DSR 112 may inspect hop-by-hop IDs stored in observed message for certain values. If an observed message is associated with a trigger indicating that PE is to be performed, DRA/DSR 112 may modify policy information in the message before sending the message to PCEF 108.

In step 308, DRA/DSR 112 may detect that the answer message includes policy information that is to be modified and may modify policy information in the answer message. For example, DRA/DSR 112 may modify charging rules in the answer message so as not to charge for the duration of the enhanced service or not charge in excess of his current or normal rates. In this example, DRA/DSR 112 may also modify other PCC rules (e.g., policy and/or QoS attributes). Such modifications may be limited based on time or other factors (e.g., network utilization). For example, modified PCC rules may expire after an hour or in response to other conditions. After the PCC rules have expired, new PCC rules may be required. In some embodiments, unmodified PCC rules may also be included in the answer message. In these embodiments, after the PCC rules have expired, the unmodified PCC rules may be applied.

In step 310, DRA/DSR 112 may send the answer message containing the modified policy information (e.g., PCC rules) to PCEF 108 and PCEF 108 may enforce the modified policy information. In some embodiments, DRA/DSR 112 may send a message to PCRF 110 or another entity (e.g., policy database 114) indicating that PE was performed and/or providing details about the PE.

In step 312, a notification message may be sent from DRA/DSR 112 to UE 102. The notification message may indicate that PE has been performed. The notification message may also include additional information, such as promotional or marketing information. In some embodiments, a confirmation or eligibility message may occur prior to PE. The eligibility message may indicate that PE is available but that confirmation or acceptance is required before the PE is to occur. The confirmation may also require the roaming subscriber to provide contact information and/or receive additional information, such as promotional or marketing information.

Figure 4:
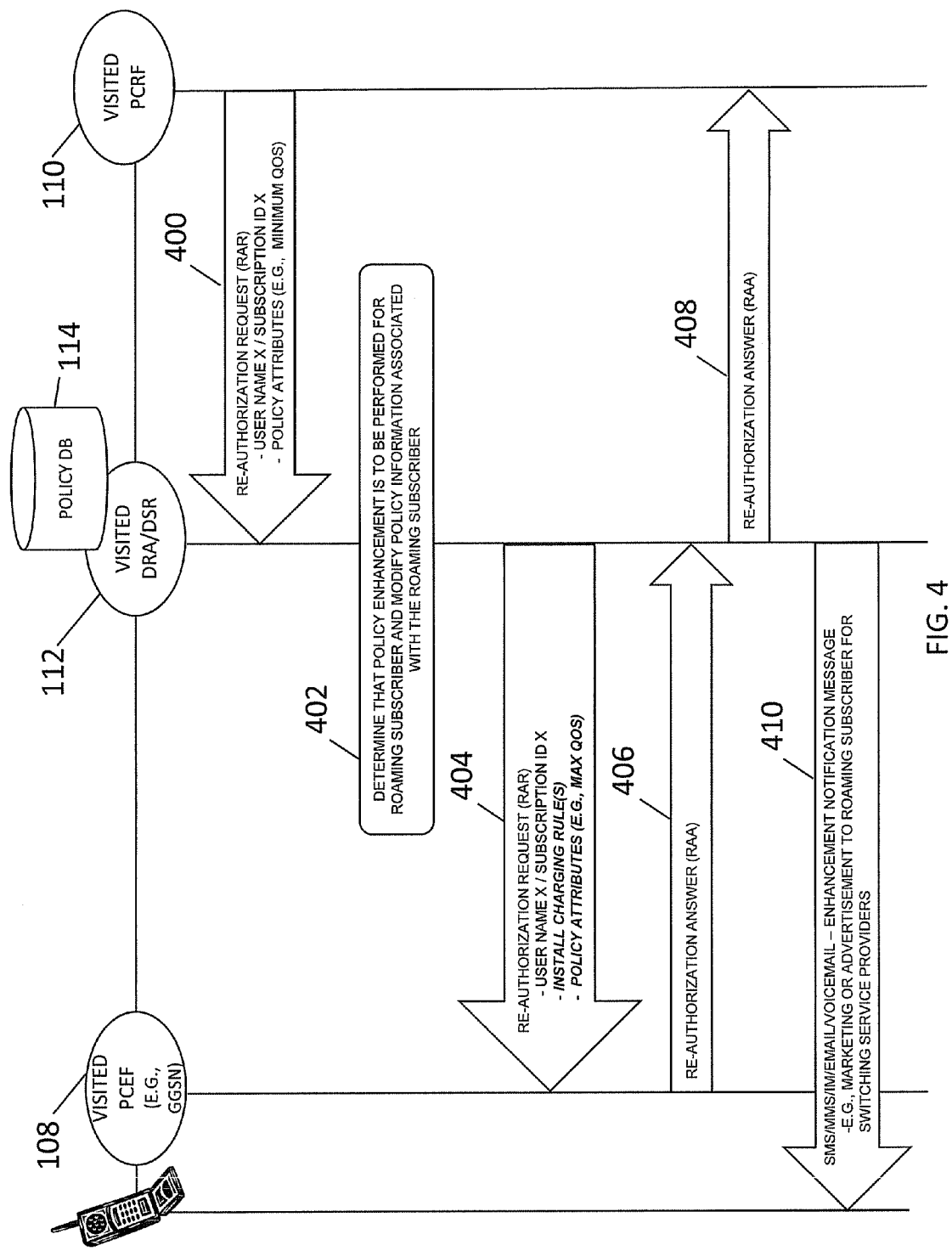
FIG. 4 is a message flow diagram illustrating modifying policy information in a re-authorization request (RAR) message according to an embodiment of the subject matter described herein.

FIG. 4 is a message flow diagram illustrating modifying policy information in a RAR message according to an embodiment of the subject matter described herein. In this embodiment, DRA/DSR 112 may be PE node 200 having PE module 204. DRA/DSR 112 may also access policy database 114.

PCEF 108 may establish a session for roaming subscriber ID 'X' through an IP Connectivity Access Network (e.g., a WLAN). PCEF 108 may request and receive PCC rules to be applied. At some point in time, PCRF 110 may initiate a PUSH procedure (e.g., policy provisioning that is not solicited by PCEF 108) to apply new PCC rules at PCEF 108. For example, PCRF 110 may decide to provision PCC rules without obtaining a request from PCEF 108, e.g., in response to information provided to PCRF 110 from an AF via the Rx interface, or in response to an internal trigger within PCRF 110. In order to provision PCC rules without a request from PCEF 108, PCRF 110 may include the PCC rules in a RAR message.

In some embodiments, before determining to initiate a PUSH procedure, PCRF 110 may receive policy information from PCRF 120 and/or another node in home network 116. For example, PCRF 110 may communicate with PCRF 120 via an S9 interface. After receiving policy information from home network 116, PCRF 110 may generate a policy provisioning message (e.g., a RAR message). The policy provisioning message may include policy information (e.g., PCC rules) based, at least in part, on information received from PCRF 120. For example, a policy provisioning message may include charging rules (e.g., rules for billing a subscriber) and policy or QoS attributes, such as QoS class identifiers, guaranteed download bitrate values, and other service affecting information.

In step 400, PCRF 110 may send a policy provisioning message towards PCEF 108. For example, the policy provisioning message may be a RAR message communicated via a Ox interface for providing policies to be applied to the IP-CAN session. In an alternate embodiment, a policy provisioning message may be sent to PCEF 108 via another interface, such as a SIP, a SOAP, or an HTTP interface.

In step 402, DRA/DSR 112 may intercept and/or receive the policy provisioning message. DRA/DSR 112 may determine, using information in the message and/or other information, that the policy provisioning message is associated with a foreign or roaming subscriber. For example, DRA/DSR 112 may query an HSS or AAA using a subscriber ID from the message or other subscriber identifying information. The HSS or AAA may respond by indicating that the subscriber ID is associated with a roaming subscriber. DRA/DSR 112 may also query policy database 114 for information about the roaming subscriber. Using this information, DRA/DSR 112 may determine that PE is to be performed. DRA/DSR 112 may modify policy information in the policy provisioning message. For example, DRA/DSR 112 may modify PCC rules (e.g., policy or QoS attributes and charging rules) for enhancing a roaming subscriber's usage experience.

In step 404, DRA/DSR 112 may send the policy provisioning message containing the modified policy information (e.g., PCC rules) to PCEF 108 and PCEF 108 may enforce the modified policy information. In step 406, PCEF 108 may send an acknowledgement message (e.g., a re-authorization answer (RAA) message) towards PCRF 110 indicating receipt and/or enforcement of the new policy information.

In step 408, DRA/DSR 112 may send the acknowledgement message or a similar message to PCRF 110. In some embodiments, DRA/DSR 112 may modify the acknowledgement message or send a separate message to PCRF 110 or another entity (e.g., policy database 114) indicating that PE was performed and/or providing details about the PE.

In step 410, a notification message may be sent from DRA/DSR 112 to UE 102. The notification message may indicate that PE has been performed. The notification message may also include additional information, such as promotional or marketing information. In some embodiments, a confirmation or eligibility message may occur prior to PE. The eligibility message may indicate that PE is available but that confirmation or acceptance is required before the PE is to occur. The confirmation may also require the roaming subscriber to provide contact information and/or receive additional information, such as promotional or marketing information.

Figure 5:
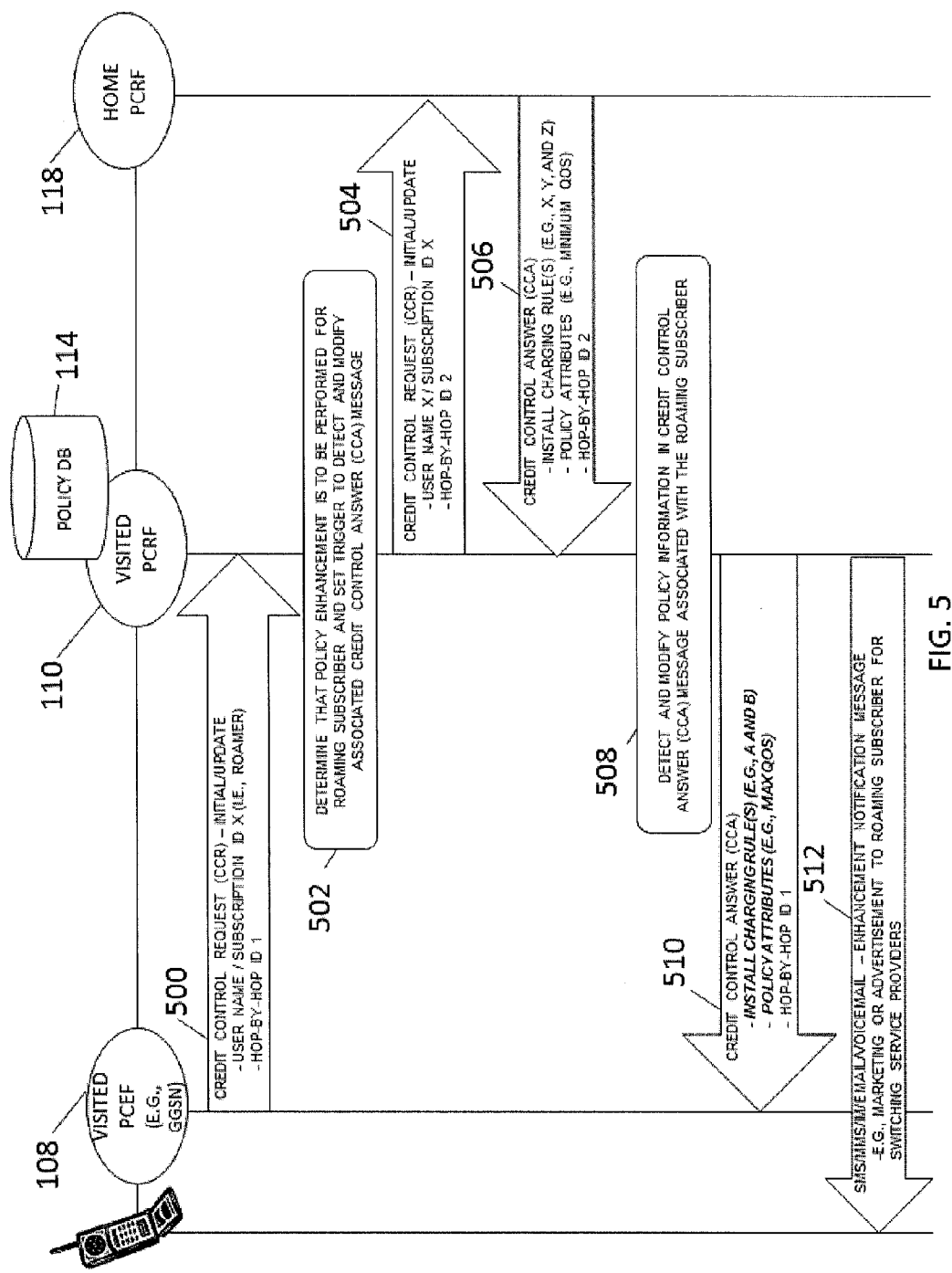
FIG. 5 is a message flow diagram illustrating modifying policy information in a credit control answer (CCA) message according to another embodiment of the subject matter described herein.

FIG. 5 is a message flow diagram illustrating modifying policy information in a CCA message according to an embodiment of the subject matter described herein. In this embodiment, PCRF 110 may be PE node 200 having PE module 204. PCRF 110 may also access policy database 114.

PCEF 108 may establish a session for roaming subscriber ID 'X' through an IP Connectivity Access Network (e.g., a WLAN). In one exemplary IP-CAN session establishment scenario, PCEF 108 may receive an IP-CAN session creation request. The IP-CAN session creation request may be a GTP message or a trigger message. In response, PCEF 108 may initiate a PULL procedure for applying relevant PCC rules associated with the roaming subscriber.

In step 500, PCEF 108 may send a policy request message towards PCRF 110. For example, the policy request message may be a CCR message communicated via a Gx interface for requesting policies to be applied to the IP-CAN session. The policy request message may be for requesting PCC rules associated with a roaming subscriber and may include a subscriber identifier (ID), a hop-by-hop ID (for identifying the last hop), and SDF information, e.g., an SDF identifier. In an alternate embodiment, a policy request message may be sent to PCRF 110 via another interface, such as a SIP, a SOAP, or an HTTP interface.

In step 502, PCRF 110 may receive the policy request message. PCRF 110 may determine, using information in the message and/or other information, that the policy request message is associated with a foreign or roaming subscriber. For example, PCRF 110 may query an HSS or AAA using a subscriber ID from the message or other subscriber identifying information. The HSS or AAA may respond by indicating that the subscriber ID is associated with a roaming subscriber. PCRF 110 may also query policy database 114 for information about the roaming subscriber. Using this information, PCRF 110 may determine that PE is to be performed. PCRF 110 may set a trigger (e.g., using Hop-by-Hop ID value 2) or use another mechanism for detecting and modifying policy information in an associated answer message (e.g., a CCR message).

In step 504, PCRF 110 may send the policy request message or similar message to PCRF 120 in home network 116. The policy request message may include a different hop-by-hop ID (e.g., a hop-by-hop ID associated with DRA/DSR 112). For example, PCRF 110 may communicate with PCRF 120 via an S9 interface.

PCRF 120 may receive the message and, using information from that message and/or other information (e.g., from a local HSS or AAA), may generate a response or answer message (e.g., a CCR message). The answer message may include policy information (e.g., PCC rules). For example, a CCR message may include charging rules and policy or QoS attributes, such as QoS class identifiers, guaranteed download bitrate values, and other service affecting information.

In step 506, PCRF 120 may send the answer message towards PCRF 110. PCRF 110 may receive the answer message. PCRF 110 may use triggers or other mechanisms for detecting answer messages that are associated with a PE service.

In step 508, PCRF 110 may detect that the answer message includes policy information that is to be modified and may modify policy information in the answer message. For example, PCRF 110 may modify charging rules and other PCC rules (e.g., policy and/or QoS attributes) so as to enhance a roaming subscriber's usage experience. Such PCC rules may be limited based on time or other factors (e.g., network utilization).

In step 510, PCRF 110 may send the answer message containing the modified policy information (e.g., PCC rules) to PCEF 108 and PCEF 108 may enforce the modified policy information. In some embodiments, DRA/DSR 112 or another entity may route the answer message to PCEF 108.

PCRF 110 may send a message to an entity (e.g., policy database 114) indicating that PE was performed and/or providing details about the PE. For example, PCRF 110 may maintain or track which roaming subscribers have received PE by storing relevant information in policy database 114.

In step 512, a notification message may be sent from PCRF 110 to UE 102. The notification message may indicate that PE has been performed. The notification message may also include additional information, such as promotional or marketing information. In some embodiments, a confirmation or eligibility message may occur prior to PE. The eligibility message may indicate that PE is available but that confirmation or acceptance is required before the PE is to occur. The confirmation may also require the roaming subscriber to provide contact information and/or receive additional information, such as promotional or marketing information.

Figure 6:
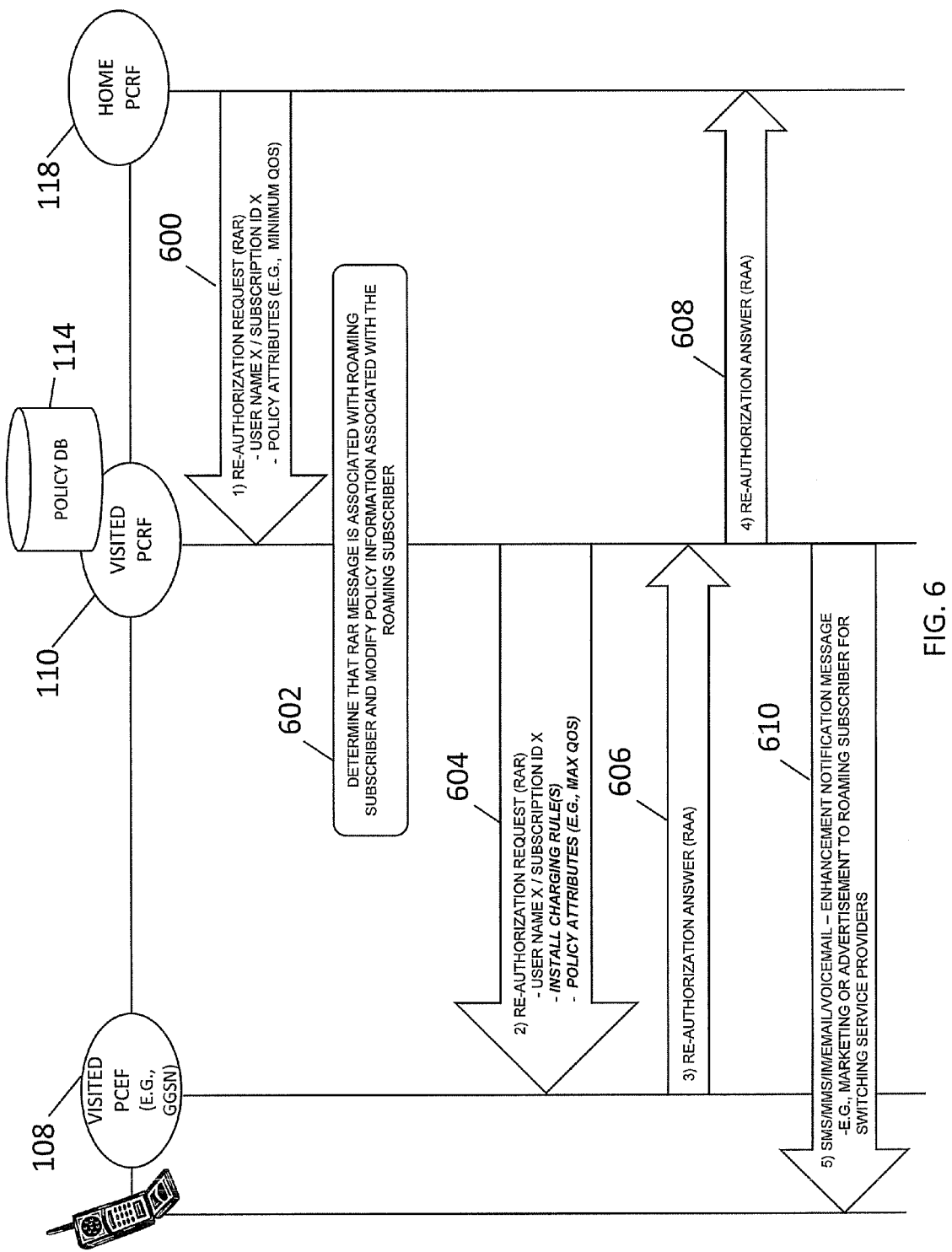
FIG. 6 is a message flow diagram illustrating modifying policy information in a re-authorization request (RAR) message according to another embodiment of the subject matter described herein.

FIG. 6 is a message flow diagram illustrating modifying policy information in a RAR message according to another embodiment of the subject matter described herein. In this embodiment, PCRF 110 may be PE node 200 having PE module 204. PCRF 110 may also access policy database 114.

PCEF 108 may establish a session for roaming subscriber ID 'X' through an IP Connectivity Access Network (e.g., a WLAN). PCEF 108 may request and receive PCC rules to be applied. At some point in time, PCRF 110 may initiate a PUSH procedure to apply new PCC rules at PCEF 108. For example, PCRF 110 may decide to provision PCC rules without obtaining a request from PCEF 108, e.g., in response to information provided by PCRF 120 or a RACS in home network 116.

In step 600, PCRF 120 may send a policy provisioning message towards PCRF 110. For example, the policy provisioning message may be a RAR message communicated via a S9 or other LTE interface for providing policies to be applied to the IP-CAN session. In an alternate embodiment, a policy provisioning message may be sent from PCRF 120 to PCRF 110 via another interface, such as a SIP, a SOAP, or an HTTP interface. The policy provisioning message may include policy information (e.g., PCC rules).

In step 602, PCRF 110 may receive the policy provisioning message. PCRF 110 may determine, using information in the message and/or other information, that the policy provisioning message is associated with a foreign or roaming subscriber. For example, PCRF 110 may query an HSS or AAA using a subscriber ID from the message or other subscriber identifying information. The HSS or AAA may respond by indicating that the subscriber ID is associated with a roaming subscriber. PCRF 110 may also query policy database 114 for information about the roaming subscriber. Using this information, PCRF 110 may determine that PE is to be performed. PCRF 110 may modify policy information in the policy provisioning message. For example, PCRF 110 may modify PCC rules for enhancing a roaming subscriber's usage experience.

In step 604, PCRF 110 may send the policy provisioning message containing the modified policy information (e.g., PCC rules) to PCEF 108 and PCEF 108 may enforce the modified policy information. In step 606, PCEF 108 may send an acknowledgement message (e.g., a re-authorization answer (RAA) message) towards PCRF 110 indicating receipt and/or enforcement of the new policy information.

In step 608, PCRF 110 may send the acknowledgement message or a similar message to PCRF 120. PCRF 110 may also send a message to an entity (e.g., policy database 114) indicating that PE was performed and/or providing details about the PE. For example, PCRF 110 may maintain or track which roaming subscribers have received PE by storing relevant information in policy database 114.

In step 610, a notification message may be sent from PCRF 110 to UE 102. The notification message may indicate that PE has been performed. The notification message may also include additional information, such as promotional or marketing information. In some embodiments, a confirmation or eligibility message may occur prior to PE. The eligibility message may indicate that PE is available but that confirmation or acceptance is required before the PE is to occur. The confirmation may also require the roaming subscriber to provide contact information and/or receive additional information, such as promotional or marketing information.

FIG. 7 is a diagram illustrating exemplary data for selective PE according to an embodiment of the subject matter described herein. Table 700 and table 702 may represent exemplary data structures stored at or in policy database 114. Table 700 may include exemplary data associated with roaming subscribers, such as subscriber usage profile data and/or log data. For example, as depicted in Table 700, a subscriber ID may be associated with average observed roaming frequency data, service or access point name (APN) usage metrics data, and PE offer log data. The subscriber ID may include any information for identifying a subscriber or related UE. For example, subscriber identifying information may include at least one of an International Mobile Subscriber Identity (IMSI) value, a mobile subscriber integrated services digital network (MSISDN) number, a short code, a uniform resource identifier (URI), an international mobile equipment identifier (IMEI), a mobile identification number (MIN), and a closed subscriber group (CSG) ID. Average observed roaming frequency data may include any information for identifying how frequently a subscriber roams in a given network (e.g., visited network 106). For example, roaming frequency data may be indicated using ratios (e.g., 10 days out of 30 days), percentages (e.g., 33%), or other ways (e.g., a color scale). Service or APN usage metrics data may include information for identifying communications usage. For example, usage metric data may include a breakdown of the services or data consumed by a subscriber. For instance, usage metric data for subscriber 'Y' may indicate amount of data is consumed as follows: 35% for web browsing, 30% for streaming video, 20% for voice calls, and 15% for email. PE offer log data may include information for identifying whether a subscriber has previously received PEs and other relevant details (e.g., date, extent, and duration of enhancements).

Table 702 may include exemplary data associated with PE offers, such as PE triggers, attributes or information to be enhanced, and duration of enhancement. For example, as depicted in Table 702, a subscriber ID may be associated with one or more PE triggers, PE offer data, and a maximum duration of PE. The subscriber ID may include any information for identifying a subscriber or related UE. PE triggers may include any information usable to trigger or initiate PE. Exemplary PE triggers or criteria may be based on subscriber identification information, home network identifying information, subscriber usage information, roaming frequency, time of day, day of week, network utilization, type of data to be accessed, an SDF identifier, user device location, a network condition, an access network, and type of user device. For example, some PE offers may be based solely on location, date, or time, while PE triggers may be based on multiple factors. PE offer data include information for indicating what policy information is to be modified and/or for indicating how much the policy information is to be modified. For example, PE offer data may indicate various policy or QoS attributes and percentages that the attributes should be increased or decreased. Exemplary policy or QoS attributes may include a guaranteed download bitrate, a download bitrate, a guaranteed upload bitrate, an upload bitrate, a permitted service flow, a permitted QoS class, a permitted access point name (APN), charging information, a permitted destination IP address, or a permitted destination IP port. A maximum duration value may include information for indicating how long enhancement is to be applied. For example, a maximum duration for enhancement may be static (e.g., an hour) or may be dynamic (e.g., based on network utilization, time of day, or other factors).

PE node 200 (e.g., PCRF 110 or DRA/DSR 112) and/or PE module 204 may query policy database 114 for various information associated with a roaming subscriber (e.g., as identified by a subscriber ID) before determining whether to perform PE. For example, PCRF 110 may retrieve usage data (e.g., from Table 700) and determine whether the subscriber is high-usage roamer or other preferable marketing target. In this example, if the subscriber has a roaming frequency above 20% and spends more than 50% of his time in the foreign network web browsing and/or streaming videos, PCRF 110 may retrieve PE offer data (e.g., from Table 702). PCRF 110 may determine based on the PE offer data which, if any, PE offers are available to the subscriber. If one or more PE offers are available, PCRF 110 may select one or multiple offers to apply. In another example, PCRF 110 may retrieve usage data and PE data concurrently in determining whether policy information should be enhanced. PCRF 110 may analyze usage data to determine whether any PE triggers or criteria have been met. If PE triggers for a given PE offer has been met, PE may be performed using the relevant PE offer.

It will be appreciated that the exemplary data and data structures in FIG. 7 are for illustrative purposes and that the data and/or data structures depicted may be changed or altered in various ways. For example, Tables 700 and 702 may be located at two separate nodes or may be combined into a single data structure. In a second example, additional and/or different information may be stored in or at policy database 114.

Figure 8:
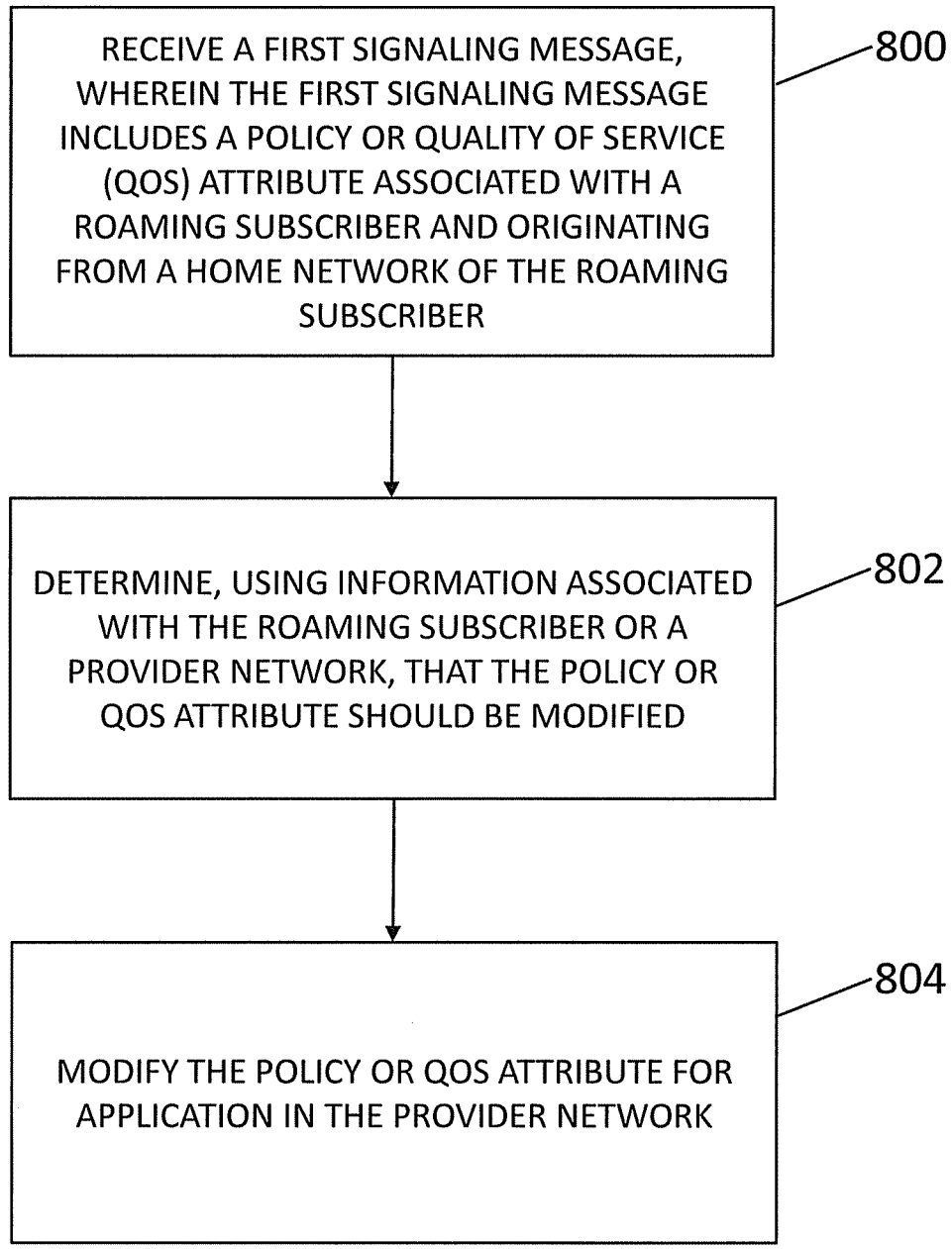
FIG. 8 is flow chart illustrating exemplary steps for modifying policy information associated with a roaming subscriber according to an embodiment of the subject matter described herein.

FIG. 8 is a flow chart illustrating exemplary steps for modifying policy information associated with a roaming subscriber according to an embodiment of the subject matter described herein. In some embodiments, the exemplary process described herein, or portions thereof, may be performed by PE node 200, a PCRF 110, and/or DRA/DSR 112.

Referring to FIG. 8, in step 800, a first signaling message may be received. The first signaling message may include a policy or QoS attribute. For example, a Diameter RAR message may be sent from PCRF 120 and received at PCRF 110. The RAR message may include a subscriber ID and one or more PCC rules or attributes.

In step 802, using information associated with the roaming subscriber or a provider network, it may be determined that the policy or QoS attribute should be modified. For example, after receiving a message containing policy information, PCRF 110 or PE module 204 may query policy database 114 using a subscriber ID from the received message. The policy database 114 may return information regarding the subscriber, such as usage statistics and/or associated PE triggers.

Using information from policy database 114 and/or other information (e.g., network conditions), PCRF 110 or PE module 204 may determine that one or more policy or QoS attributes should be modified or enhanced.

In step 804, the policy or QoS attribute is modified for application in the provider network. For example, PCRF 110 may increase a download bitrate policy attribute associated with the roaming subscriber by 25%. PCRF 110 may then send the modified policy attribute to PCEF 108 for application. For example, PCRF 110 or PE module 204 may be configured to generate a PCC rule based on the modified policy or QoS attribute and may communicate the PCC rule to PCEF 108. PCEF 108 may enforce the modified policy attribute for any communications associated with the roaming subscriber. PCRF 110 or another entity may notify the roaming subscriber about the PE.

In some embodiments, PCRF 110 or PE module 204 may send an unmodified version of the policy or QoS attribute in addition to the modified policy or QoS attribute. For example, PCEF 108 may apply the unmodified version of the policy or QoS attribute when the policy or QoS attribute expires.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for modifying policy information associated with a roaming subscriber, the method comprising:
    receiving a first signaling message, wherein the first signaling message includes a policy or quality of service (QoS) attribute associated with a roaming subscriber and originating from a home network of the roaming subscriber;
    determining, using information associated with the roaming subscriber or a provider network, that the policy or QoS attribute should be modified; and
    modifying the policy or QoS attribute for application in the provider network, wherein the policy or QoS attribute is modified at a Diameter signaling router (DSR) or a Diameter routing agent (DRA).

2. The method of claim 1 including generating a policy and charging control (PCC) rule based on the modified policy or QoS attribute.

3. The method of claim 2 including communicating the PCC rule to a policy and charging enforcement function (PCEF).

4. The method of claim 3 wherein communicating the PCC rule to the PCEF including applying the policy or QoS attribute at the PCEF so as to temporarily enhance the roaming subscriber's experience for enticing the roaming subscriber to subscribe to the provider network.

5. The method of claim 1 including notifying the roaming subscriber of the modification.

6. The method of claim 1 wherein notifying the roaming subscriber includes sending a short message service (SMS) message, a multimedia message service (MMS) message, an instant message (IM) message, an email message, an XML message, a simple object access protocol (SOAP) message, a Diameter protocol message, a session initiation protocol (SIP) message, an Internet protocol (IP) message, or a voice message.

7. The method of claim 1 wherein the information associated with the roaming subscriber or a provider network includes subscriber identification information, home network identifying information, subscriber usage information, a network condition, an access network, a policy enhancement trigger, time of day, day of week, network utilization, type of data to be accessed, user device location, and type of user device.

8. The method of claim 1 wherein the first message is sent from or to a policy and charging rules function (PCRF), a Diameter signaling router (DSR), or a Diameter routing agent (DRA), or a resource admission control subsystem (RACS).

9. The method of claim 1 wherein the policy or QoS attribute includes a guaranteed download bitrate, a download bitrate, a guaranteed upload bitrate, an upload bitrate, a permitted service flow, a permitted QoS class, a permitted access point name (APN), charging information, a permitted destination IP address, or a permitted destination IP port.

10. The method of claim 1 wherein the first message originates from the home network and the policy or QoS attribute is modified by a network element in a visited network.

11. A method for modifying policy information associated with a roaming subscriber, the method comprising:
    receiving a first signaling message, wherein the first signaling message includes a policy or quality of service (QoS) attribute associated with a roaming subscriber and originating from a home network of the roaming subscriber;
    determining, using information associated with the roaming subscriber or a provider network, that the policy or QoS attribute should be modified; and
    modifying the policy or QoS attribute for application in the provider network;
    generating a policy and charging control (PCC) rule based on the modified policy or QoS attribute;
    communicating the PCC rule to a policy and charging enforcement function (PCEF), wherein communicating the PCC rule to the PCEF includes sending an unmodified version of the policy or QoS attribute in addition to the policy or QoS attribute and applying the unmodified version of the policy or QoS attribute when the policy or QoS attribute expires.

12. A system for modifying policy information associated with a roaming subscriber, the system comprising:
    at least one communications interface configured to receive a first signaling message, wherein the first signaling message includes a policy or quality of service (QoS) attribute associated with a roaming subscriber and originating from a home network of the roaming subscriber; and
    a policy enhancement (PE) module configured to determine, using information associated with the roaming subscriber or a provider network, that the policy or QoS attribute should be modified and configured to modify the policy or QoS attribute for application in the provider network, wherein the PE module is implemented by a Diameter signaling router (DSR) or a Diameter routing agent (DRA).

13. The system of claim 12 wherein the policy enhancement (PE) module is configured to generate a policy and charging control (PCC) rule based on the modified policy or QoS attribute.

14. The system of claim 13 wherein the system is configured to communicate the PCC rule to a policy and charging enforcement function (PCEF).

15. The system of claim 14 wherein communicating the PCC rule to the PCEF includes applying the policy or QoS attribute at the PCEF so as to temporarily enhance the roaming subscriber's experience for enticing the roaming subscriber to subscribe to the provider network.

16. The system of claim 12 wherein the at least one communications interface is configured to notify the roaming subscriber of the modification.

17. The system of claim 12 wherein the at least one communications interface is configured to notify the roaming subscriber using a short message service (SMS) message, a multimedia message service (MMS) message, an instant message (IM) message, an email message, an XML message, a simple object access protocol (SOAP) message, a Diameter protocol message, a session initiation protocol (SIP) message, an Internet protocol (IP) message, or a voice message.

18. The system of claim 12 wherein the information associated with the roaming subscriber or a provider network include subscriber usage information, a network condition, an access network, a policy enhancement trigger, time of day, day of week, network utilization, type of data to be accessed, user device location, and type of user device.

19. The system of claim 12 wherein the first message is sent from or to a policy and charging rules function (PCRF), a Diameter signaling router (DSR), or a Diameter routing agent (DRA), or a resource admission control subsystem (RAGS).

20. The system of claim 12 wherein the policy or QoS attribute includes a guaranteed download bitrate, a download bitrate, a guaranteed upload bitrate, an upload bitrate, a permitted service flow, a permitted QoS class, a permitted access point name (APN), charging information, a permitted destination IP address, or a permitted destination IP port.

21. The system of claim 12 wherein the first message originates from the home network and the policy or QoS attribute is modified by a network element in a visited network.

22. A system for modifying policy information associated with a roaming subscriber, the system comprising:
    at least one communications interface configured to receive a first signaling message, wherein the first signaling message includes a policy or quality of service (QoS) attribute associated with a roaming subscriber and originating from a home network of the roaming subscriber; and
    a policy enhancement (PE) module configured to determine, using information associated with the roaming subscriber or a provider network, that the policy or QoS attribute should be modified and configured to modify the policy or QoS attribute for application in the provider network, wherein the policy enhancement (PE) module is configured to generate a policy and charging control (PCC) rule based on the modified policy or QoS attribute, wherein the system is configured to communicate the PCC rule to a policy and charging enforcement function (PCEF), wherein communicating the PCC rule to the PCEF includes sending an unmodified version of the policy or QoS attribute in addition to the policy or QoS attribute and applying the unmodified version of the policy or QoS attribute when the policy or QoS attribute expires.

23. A non-transitory computer readable medium comprising computer executable instructions that when executed by a processor of a computer control the computer to perform steps comprising:
    receiving a first signaling message, wherein the first signaling message includes a policy or quality of service (QoS) attribute associated with a roaming subscriber and originating from a home network of the roaming subscriber;
    determining, using information associated with the roaming subscriber or a provider network, that the policy or QoS attribute should be modified; and modifying the policy or QoS attribute for application in the provider network, wherein the policy or QoS attribute is modified at a Diameter signaling router (DSR) or a Diameter routing agent (DRA).

* * * * *